(12) United States Patent
Crews

(10) Patent No.: US 12,545,439 B2
(45) Date of Patent: Feb. 10, 2026

(54) TILT DRIVE FOR ELECTROMAGNETIC FORCE VECTORING

(71) Applicant: Eric Jason Crews, Blacksburg, VA (US)

(72) Inventor: Eric Jason Crews, Blacksburg, VA (US)

( * ) Notice: Subject to any disclaimer, the term of this patent is extended or adjusted under 35 U.S.C. 154(b) by 93 days.

(21) Appl. No.: 19/024,883

(22) Filed: Jan. 16, 2025

(65) Prior Publication Data

US 2025/0296708 A1  Sep. 25, 2025

Related U.S. Application Data

(60) Provisional application No. 63/568,716, filed on Mar. 22, 2024.

(51) Int. Cl.
*B64G 1/40* (2006.01)
*F03H 1/00* (2006.01)

(52) U.S. Cl.
CPC ............ *B64G 1/417* (2023.08); *F03H 1/0081* (2013.01)

(58) Field of Classification Search
CPC .......... B64G 1/417; F03H 1/0081; H01F 6/00
See application file for complete search history.

(56) References Cited

U.S. PATENT DOCUMENTS

| | | | | |
|---|---|---|---|---|
| 6,193,194 B1 * | 2/2001 | Minovitch | ............. | B64G 1/417 60/202 |
| 6,279,314 B1 * | 8/2001 | Valentian | ............. | F03H 1/0075 60/202 |
| 9,796,487 B2 * | 10/2017 | Yi | ............. | B64G 1/409 |
| 10,615,678 B2 * | 4/2020 | Hester | ............. | H02K 33/10 |
| 11,488,757 B2 * | 11/2022 | Seng | ............. | B60L 13/00 |
| 11,646,142 B2 * | 5/2023 | Hawkins | ............. | H01F 7/0273 60/202 |
| 12,140,126 B2 * | 11/2024 | Romano | ............. | F03H 1/0081 |
| 12,157,586 B2 * | 12/2024 | King | ............. | F02K 9/80 |
| 2006/0290287 A1 * | 12/2006 | Kuninaka | ............. | F03H 1/0075 315/111.61 |
| 2011/0020156 A1 * | 1/2011 | Van Brunt | ............. | H02K 33/16 417/487 |
| 2012/0169147 A1 * | 7/2012 | Kirma | ............. | H02K 33/14 310/20 |
| 2013/0147582 A1 * | 6/2013 | Athanassios | ............. | H01F 6/00 335/216 |
| 2017/0210493 A1 * | 7/2017 | Marchandise | ......... | B64G 1/443 |
| 2021/0009287 A1 * | 1/2021 | Gonzalez | ............. | B64G 1/44 |

(Continued)

FOREIGN PATENT DOCUMENTS

CN 111602328 A * 8/2020 ............. B64G 1/417

*Primary Examiner* — Brian M O'Hara
(74) *Attorney, Agent, or Firm* — Dunlap Bennett & Ludwig, PLLC

(57) ABSTRACT

An electromagnetic drive using sealed magnetism to produce force vectoring. The force vectoring electromagnetic drive is configured to use a dislocated/differentiated pressure source to produce motion. When mounted to a vessel, the force vectoring electromagnetic drive re-introduces is configured to urge magnetic suction, which in turn causes magnetic repellence controlled by hydraulic piston assemblies, thereby enabling force vector propulsion for the vessel. The force vectoring electromagnetic drive re-introduces produced electrical current back into the system.

7 Claims, 1 Drawing Sheet

(56) References Cited

U.S. PATENT DOCUMENTS

| | | | |
|---|---|---|---|
| 2024/0375795 A1* | 11/2024 | Gadagkar | B64G 1/409 |
| 2025/0132082 A1* | 4/2025 | Tiago Baptista De Alves Martins | F03H 99/00 |

* cited by examiner

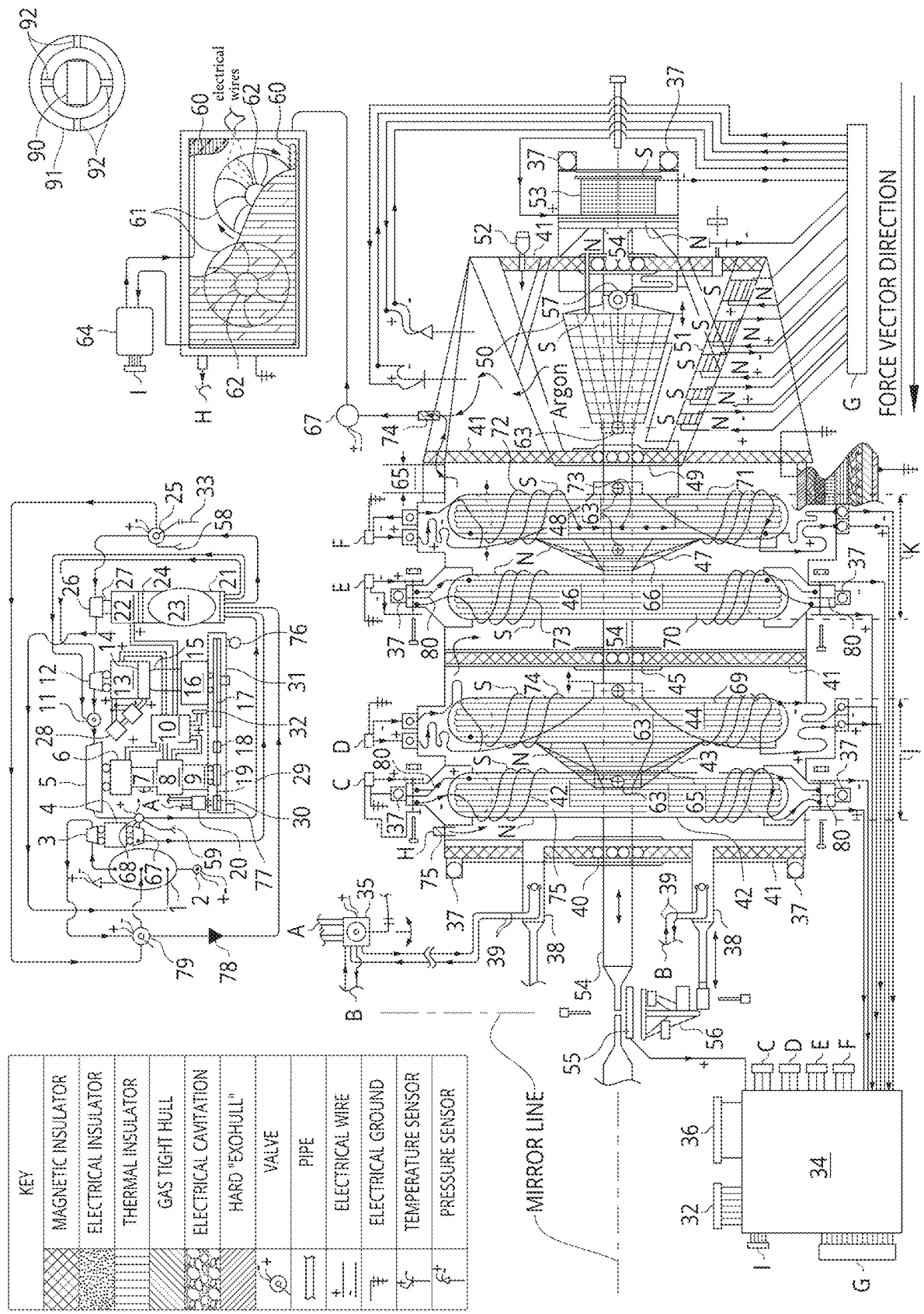

TILT DRIVE FOR ELECTROMAGNETIC FORCE VECTORING

CROSS REFERENCE TO RELATED APPLICATION

This application claims the benefit of priority of U.S. provisional application No. 63/568,716, filed Mar. 22, 2024, the contents of which are herein incorporated by reference.

BACKGROUND OF THE SUBJECT DISCLOSURE

The present invention relates to force vectoring, and more particularly, to a magnetic tilt drive for providing electromagnetic force vectoring.

Conventional air flight utilizes turbines, turbofans, turbopropellers, or piston-driven propellers to provide the thrust necessary for lift. However, the performance of conventional systems can degrade due to weather conditions and are subject to failure due to bird strikes and other environmental-related disadvantages.

Separately, propulsion in zero gravity is possible with a fuel-less force vectoring system.

As can be seen, there is a need for an electromagnetic force vectoring system that can be sealed from environmental conditions that can provide the lift necessary for air flight, and wherein this "tilt drive" can produce inclining speed for thrust vectoring an object to force vector in outer space as well as be used for course correction (yaw, pitch, roll) by manipulating the direction of thrust.

SUMMARY OF THE SUBJECT DISCLOSURE

The following electromagnetic 'tilt drive' is intended to demonstrate that sealed magnetism can produce force vectoring. The subject disclosure is configured to use a dislocated/differentiated pressure source to produce motion. Magnetic suction (causing magnetic repellent) is selectively controlled by hydraulic piston assemblies, thereby affording a vessel to force vector when the subject disclosure is mounted to the vehicle's hull. The subject disclosure can re-introduce electrical current, produced during use, back into its functions.

The subject disclosure embodies an energy generator system using pneumatically pressurized hydraulic fluid to produce electricity in zero gravity to then electrify the electromagnetic drive system.

In one aspect of the subject disclosure, an electromagnetic drive system includes a plurality of a sealed electromagnetic elements component configured to produce a plurality of force vectors; a pressure differential generator to selectively electrify said electromagnets elements; and the plurality of a sealed electromagnetic elements comprises a spatial relationship between magnetically attractive and magnetically repellent electromagnetic elements, respectively, whereby selective electrification among said relative magnetically attractive and magnetically repellent electromagnetic elements changes variances to the force vectoring, whereby a vessel coupled to the electromagnetic drive system moves.

In another aspect of the subject disclosure, the electromagnetic drive system further includes a hydraulic fluid driven piston system configured to physically move independent electromagnetic elements relative to the plurality of sealed electromagnetic elements, thereby altering the relative magnetic attraction and repulsion, wherein selective electrification of the plurality of sealed electromagnetic elements enables a range of magnetic suction; further providing a hydraulic piston assembly configured to control the range of magnetic suction, wherein the pressure differential generator employs pneumatically pressurized hydraulic fluid to produce an electricity source via fluid motion, wherein the plurality of sealed electromagnetic elements, and wherein a flow cycle of said hydraulic fluid urges a hydraulic fluid suction effect.

In yet another aspect of the subject disclosure, an electromagnetic drive system the following components are operatively associated with each other: a plurality of sealed electromagnetic elements configured to produce a plurality of force vectors; a pressure differential generator to selectively electrify said electromagnets elements; and the plurality of a sealed electromagnetic elements comprises a spatial relationship between magnetically attractive and magnetically repellent electromagnetic elements, respectively, whereby selective electrification among said relative magnetically attractive and magnetically repellent electromagnetic elements urges trust vectoring of a vessel to which the electromagnetic drive system is fixed.

These and other features, aspects and advantages of the present subject disclosure will become better understood with reference to the following drawings, description and claims.

BRIEF DESCRIPTION OF THE DRAWINGS

The sole FIGURE is a schematic view of an exemplary embodiment of the subject disclosure.

DETAILED DESCRIPTION OF THE SUBJECT DISCLOSURE

The following detailed description is of the best currently contemplated modes of carrying out exemplary embodiments of the subject disclosure. The description is not to be taken in a limiting sense but is made merely for the purpose of illustrating the general principles of the subject disclosure, since the scope of the subject disclosure is best defined by the appended claims.

As stated above, traditional air flight systems are subject to environmental conditions such as weather and wildlife, which can cause malfunctions.

Broadly, an embodiment of the present invention provides a magnetic drive, herein Tilt drive, using sealed magnetism to produce force vectoring. The Tilt drive can re-introduce operationally produced electrical current back into the system. The subject disclosure can use a dislocated/differentiated pressure source to produce a motive force. Magnetic suction causes magnetic repellence controlled by hydraulic piston assemblies which cause the vessel to force vector when the Tilt drive is mounted to a vessel's hull.

PARTS LIST 1. vacuum retaining pressure tank
2. vacuum level sensor
3. vacuum pump
4. brush-less drive motor dual shaft
5. large volume hydraulic fluid pump
6. brush-less electric motor dual shaft
7. air conditioner refrigeration compressor
8. brush-less electric motor dual shaft
9. 1:10 ratio gear set input tandem to the drive sprocket
10. main logic generator system control unit electronic mapping electronic logic circuit box 11. hydraulic fluid safety inlet valve system speed limiter
12. hydraulic fluid draft impeller small volume advances total system by the effect of pneumatically pressurized oil traversing while tandem rotating with the connected drive line assemblies
13. main high voltage electricity generator
14. permanent magnet Magneto
15. 1:4 ratio gear set rotation output/high side tandem rotating with #16
16. electromagnetic field speed brake system providing rotational speed control
17. large 12" diameter sprocket drive sprocket
18. small drive chain tension sprocket, in some embodiments having a diameter of approximately three inches.
19. receiving sprocket, in some embodiments having a diameter of approximately four inches.
20. hydraulic fluid pressure pump
21. fluid and pneumatic pressure slip ring pressure transfer pressure seal
22. dual shaft brush-less electric motor
23. rotating pressure retainer for hydraulic fluid and air pressure able to re-start in zero gravity
24. pressure retaining slip ring pressure seal accepts the rotational torque from number 22 causing the pressure tank to rotate
25. generator system start valve
26. start cycle pneumatic impeller
27. RPM revolutions per minute sensor connects to number 10 and adjust number 8's base idle current level
28. redundant voltage regulator system controls the field coil for the main high voltage generator
29. sprocket system drive chain
30. receiving sprocket drives the hydraulic fluid pump
31. drive chain and sprocket system oil lubrication encasement
32. multi wire "ribbon wire "bus" connector
33. manual actuation valve pull cable
34. electronic logic circuit box system control electronic circuit box power management system
35. hydraulic fluid control valve contains hydraulic fluid reservoir with pneumatic pressurization to allow for minor pressure/back pressure to flex piston assembly pressure—unit contains position actuation sensor to assist in the logic circuits changing the electromagnetic level intensity when the acceleration or breaking/retro function is instigated.
36. multi wire information wire bus clip connects to instrumentation control for manual adjustment interface
37. electrically insulated mounting system bolt and nut bore
38. hydraulic fluid driven piston system adjust electromagnetic electromagnets "proxy/distance" a "safety system" in addition to the worm gear unit depicted below
39. hydraulic fluid transfer pipes
40. slide rod guide bearing race
41. electromagnetic field insulator
42. high gain electromagnet
43. electromagnetic pick-up coil and mounting bracket
44. electromagnet
45. slide rod bearing retainer (upon all three bearing guide assemblies)
46. electromagnet
47. electromagnet mounting system with coil wound electricity pick up coil
48. electromagnet
49. magnetically insulated bearing race retainer non electrically conductive
50. electrical ionizer/Argon gas flow accelerator and electricity pick up screen unit
51. venturi electro-magnetics
52. one way Argon gas fill valve
53. base gain electromagnet
54. slide rod (electrically conductive)
55. slide rod electrically conductive circuit connector plate—one side electrically insulated to prevent electrification of number 56—nut and bolt assembly contains titanium center pin—the nuts and bolts are non-electrically conductive exterior
56. hydraulic piston assembly force transfer bracket with high strength metal
57. return electrical mount non electrically conductive to the slide rod
58. one-way hydraulic fluid oil fill valve
59. one-way pneumatic pressure fill valve
60. argon gas chilling radiator
61. cooling fan
62. brush-less electric cooling fan electric motor
63. electromagnet mounting system electrically conductive causes the slide rod to induce electricity
64. refrigeration system
65. internal chamber gas flow vents 360 degrees
66. electricity pick up coil
67. hydraulic fluid drive impeller a dual function unit pumping both argon and is impaled by hydraulic fluid a dual function unit
68. hydraulic fluid flow control valve
69. toroid wind electricity pick up
70. circumference wind electromagnet
71. circumference wind electromagnet
72. toroid wind electricity pick up
73. toroid wind electricity pick up
74. toroid wind electricity pick up
75. toroid wind electricity pick up
76. lubrication oil fill
77. threaded oil drain plug
78. pneumatic one-way valve
79. pneumatic vacuum/air pressure safety balancer valve electrically adjusted by system parameters for safety
80. electrically nonconductive divider
81. label letter "A" connects to letter "A"
82. label letter "B" connects to letter "B"
83. label letter "C" connects to letter "C"
84. label letter D" connects to letter "D"
85. label letter "E" connects to label letter "E"
86. label letter "F" connects to letter label "F"
87. label letter "G" connects to label letter "G"
88. label letter "H" connects to letter "H"
89. label letter "I" connects to label letter "I"
90. Tilt Drive System
91. inner circumference positional sensor
92. positional motorized servo motors mobile with positional sensors label letter "J" is attractant aligned electromagnets label letter "K" is repulsive aligned electromagnets Referring now to the sole FIGURE, the subject disclosure embodies a tilt drive system, according to aspects of the subject disclosure. The tilt drive system will be described with respect to the components of the system. The tilt drive system can have a vacuum/pressure differential electricity generating assembly to electrify the system's electromagnets.

Repellent equals total mass weight of the vehicle and the magnetic suction (magnetic attracting assembly), with increased variance to "wick" the repellent forward stabilized by the hydraulic piston assemblies with the assistance of positionally adjustable electromagnetic elements.

Directional movement is achieved through an unbalanced "static" force vector equation of the full system when factoring the "mirror lines factor", force "static" (offset by perpendicular force extraction by hydraulic fluid via the hydraulic fluid piston system), whereby in one embodiment the mirrored unit has greater magnet pulling upon the letter "J" assembly in the force vector direction. This is the "electromagnetic wick effect".

The variable intensity of a ring electromagnetic element selectively enables a systemic "retro"/breaking function that will change the electromagnet intensity and, if required, in tandem with the hydraulic piston assembly's position.

The directional movement functionality may be used for navigation course correction (yaw, pitch, roll) and added to the drive system for flight speed stabilization or speed incline.

Note, Argon may be used in the cooling cycle for forming a Coriolis vortex in the chambers containing the pick-screen 50 via the Nobel gas entry ducts and by electromagnetic.

Regarding Gauss intensity in the chamber containing the screen unit 50, in addition the following description of the hydraulic control system may include the sum of two in total system, each side of the hydraulic piston assembly force transfer bracket 56 in diametrically opposed position, wherein the union joined to the hydraulic piston assembly force transfer bracket 56 at the connection linkage with hydraulic connection to the "mirror lines" half of the design connecting to the hydraulic fluid direction valve 35.

The generator system uses a pneumatically pressurized hydraulic fluid to produce fluid motion yielding sustained electricity production to electrify the tilt drive mechanism. The air pressure causes oil pressure in the rotating tumbler to force fluid/air stratification due to centrifugal motion. The "work potential" is cyclical and "retained" due to the "phase" of matter. Air pressure flexes and hydraulic fluid exhibits properties of a solid. The flow cycle for the generator's hydraulic oil then causes a "hydraulic fluid "suction" effect. Fluid does not "stretch" within the confinement of a rigid oil flow pipe. This in tandem with the generator's electrical re-introduction circuit allows for generator speed incline yielding sufficient levels of electrical production then applied to the tilt drive's electromagnets and the refrigeration system that cools the internal gas within the "Tilt drive". This causes the work potential of the air pressure to impale the drive impeller within the generator assembly to cause fluid suction at a greater rate than fluid discharge then returning the hydraulic fluid back to pressurized confinement faster than the oil discharge rate.

A vacuum level sensor can track the vacuum level in pressure tank 1. Vacuum pump 3 can be operable to pump gas from pressure tank 1 to induce a vacuum in pressure tank 1. A brushless drive motor dual shaft 4 can be connected to a hydraulic fluid drive impeller 67 with a dual function unit pumping both argon and is impaled by hydraulic fluid a dual function unit. Drive Impeller 67 can be connected to a hydraulic fluid flow control valve 68 for controlling the flow hydraulic fluid from a large volume hydraulic fluid pump 5 to a rotating pressure retainer 23 for hydraulic fluid and air pressure able to re-start in zero gravity. Control valve 68 can also be connected to a one-way pneumatic pressure fill valve 59.

A brushless electric motor dual shaft 6 can be connected to an air conditioner refrigeration compressor 7 which can be further connected by a 1:10 ratio gearset input tandem to the drive sprocket 9. A brushless electric motor dual shaft 8 can be connected to a hydraulic fluid pressure pump 20. A main logic generator system control unit electronic mapping electronic logic circuit box 10 can drive dual motor shaft 6 and 8. Circuit box 10 can include a multi-wire bus 32.

Referring to hydraulic fluid pump 5, a hydraulic fluid safety inlet valve system speed limiter 11 can be placed on the input side. Limiter 11 receives fluid from pressure retainer 23 as well as from a small volume hydraulic fluid draft impeller 12 which can advance total system by the effect of pneumatically pressurized oil traversing while tandem rotating with the connected drive line assemblies.

A main high voltage electricity generator 13 receives commands from logic circuit box 10 and can contain a redundant voltage regulator system 28 for controlling the field coil for the main high voltage generator 13. Main high voltage generator 13 can also contain a permanent magnet Magneto 14, which can be connected to a 1:4 ratio gear set 15 rotation output/high side tandem that rotates with an electromagnetic field speed brake system rotational speed control 16.

A drive chain and sprocket system oil lubrication encasement 31 can include a large 12-inch diameter drive sprocket 17, a small drive chain tension sprocket 3-inch diameter 17, and a receiving sprocket 4-inch diameter 19, connected as shown in FIG. 1. Lubrication encasement 31 can be filled using lubrication oil fill valve 76 and drained using threaded oil drain plug 77. A sprocket system drive chain 29 can connect receiving sprocket 19 with a sprocket 30 that can drive pressure pump 20.

Referring to pressure retainer 23, a fluid and pneumatic pressure slip ring transfer pressure seal 21 surrounds the bottom of retainer 23, while a dual shaft brushless electric motor 22 connects to a pressure retaining slip ring pressure seal 24 which can accept the rotational torque from motor 22 causing the pressure tank 23 to rotate. A revolutions-per-minute sensor connects 27 to circuit control 10 and adjusts the dual motor shaft 8 base idle current level. Furthermore, a start-cycle pneumatic impeller 26 can connect to electric motor 22.

The system is started by a generator system start valve 25 which can be connected to a manual actuation valve pull cable 33 for manual starting. Start valve 25 can also be connected to a one-way hydraulic fluid oil fill valve 58 which can be used to fill the system with hydraulic fluid. Start valve 25 can be operatively connected to a pneumatic vacuum/air pressure safety balancer valve 79 electrically adjusted by system parameters for safety, which can provide for pneumatic one-way valve 78.

Hydraulic fluid pressure pump 20 can be connected at a second end to a hydraulic fluid control valve 35 which can contain a hydraulic fluid reservoir with pneumatic pressurization to allow for minor pressure/back pressure to flex a piston assembly pressure. A unit of control valve 35 can contain position actuation sensors to assist in the logic circuits changing the electromagnetic level intensity when the acceleration or braking/retro function is initiated.

Control valve 35 can be connected to a hydraulic fluid driven piston system 38 via hydraulic fluid transfer pipes 39. Piston system 38 can adjust the electromagnetic elements in addition to the worm gear unit, described hereinafter. Piston system 38 can be insulated by electromagnetic field insulator 41 and be coupled to hydraulic piston assembly force transfer bracket 56 which can be made of high strength metal. A slide rod electrically conductive circuit connector plate 55 with one side electrically insulated to prevent electrification of force transfer bracket 56. A non-electrically conductive nut and bolt assembly to couple bracket 56 to plate 55 can contain a titanium center pin.

In one embodiment, the electromagnetic elements are controlled through the manipulation of the electric current flowing through a conductor, which directly affects the strength and direction of the generated magnetic field; this may be achieved by using electromagnets, where adjusting the current allows one to turn the magnetic field on or off and control its intensity, effectively controlling the electromagnetic force involved. Electronic logic circuit box system 34 can control electronic circuit box power management system. Box system 34 can include multi-wire information wire bus clip 36 which can connect to instrumentation control for manual adjustment of the interface. Circuit box system 34 can control electromagnets of the current system. For example, circuit box system 34 can control high gain electromagnet 42, electromagnet 44, electromagnet 46, electromagnet mounting system with coil wound electricity pick up coil 47, electromagnet 48, circumference wind electromagnet 70 and circumference wind electromagnet 71. Electrically insulated mounting system bolt and nut bore 37 and electrically non-conductive divider 80 can be utilized to secure electromagnets to the system. Each of electromagnets 42, 44, 46-48, 70 and 71 can be surrounded by toroid wind electricity pick-ups 69 and 72-75. Pick-ups 69 and 74 can be installed via electromagnetic pick-up coil and mounting bracket 43.

A slide rod guide bearing race 40 can be operatively associated with a field insulator 41 for providing support for an electrically conductive slide rod 54. Slide rod 54 can be held in place by slide rod retainer 45 using bearing guide assemblies. Slide rod 54 can be retained via magnetically insulated bearing race retainer 49 which can be non-electrically conductive. Furthermore, electromagnet mounting system 63 electrically conductive causes the slide rod to induce electricity.

Referring now to an electrical ionizer/Argon gas flow accelerator and electricity pick up screen unit 50, which can be used by the system. Venturi electromagnetics 51 can be installed proximate to screen unit 50. A one-way Argon gas fill valve 52 can be utilized to fill the system with Argon gas. A base-gain electromagnet 53 can be installed which can be utilized to actuate slide rod 54. Slide rod can have a return mount 57 which can be non-electrically conductive.

Argon can be stored before being provided to screen unit 50. To keep Argon cool, the system can include a refrigeration system 64, which can include cooling fan 61 that can move fluid across gas chilling radiator 60. Fans 61 can be powered by brushless electric cooling fan electric motor 62. Internal to the electromagnet system can be an internal chamber gas flow 65 that can vent 360 degrees and electricity pick up coil 66.

The generator system electrifies the ring electromagnets to cause a magnetic draft effect to then cause, by way of the mechanical linkage "rod mounting", a repulsive effect between the repulsive electromagnets. The attractant electromagnets then with greater magnetic field can cause compression of the repulsive magnetic fields. Controlling the magnet moment with sufficient magnetic draft to pull from the attractant electromagnets, causing magnetic tilt in vector effectively yielding motion tendency.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the subject disclosure and that modifications may be made without departing from the spirit and scope of the subject disclosure as set forth in the following claims.

What is claimed is:

1. An electromagnetic drive system, comprising:
   a plurality of sealed electromagnetic elements configured to produce a plurality of force vectors;
   a pressure differential generator to selectively electrify said electromagnets elements; and
   the plurality of a sealed electromagnetic elements comprises a spatial relationship between magnetically attractive and magnetically repellent electromagnetic elements, respectively, whereby selective electrification among said relative magnetically attractive and magnetically repellent electromagnetic elements changes variances to the force vectoring, whereby a vessel coupled to the electromagnetic drive system moves.

2. The electromagnetic drive system of claim 1, further comprising:
   a hydraulic fluid driven piston system configured to physically move independent electromagnetic elements relative to the plurality of sealed electromagnetic elements, thereby altering the relative magnetic attraction and repulsion.

3. The electromagnetic drive system of claim 2, wherein selective electrification of the plurality of sealed electromagnetic elements enables a range of magnetic suction.

4. The electromagnetic drive system of claim 3, further comprising a hydraulic piston assembly configured to control the range of magnetic suction.

5. The electromagnetic drive system of claim 4, wherein the pressure differential generator employs pneumatically pressurized hydraulic fluid to produce an electricity source via fluid motion, wherein the plurality of sealed electromagnetic elements.

6. The electromagnetic drive system of claim 5, wherein a flow cycle of said hydraulic fluid urges a hydraulic fluid suction effect.

7. An electromagnetic drive system, comprising:
- a plurality of sealed electromagnetic elements configured to produce a plurality of force vectors;
- a pressure differential generator to selectively electrify said electromagnets elements; and
- the plurality of a sealed electromagnetic elements comprises a spatial relationship between magnetically attractive and magnetically repellent electromagnetic elements, respectively, whereby selective electrification among said relative magnetically attractive and magnetically repellent electromagnetic elements urges trust vectoring of a vessel to which the electromagnetic drive system is fixed.

* * * * *